Sept. 11, 1934.　　　　　J. M. EGLIN　　　　　1,972,877
CONCENTRIC RETURN TRANSMISSION SYSTEM Filed Jan. 14, 1932　　　2 Sheets-Sheet 1

INVENTOR
J.M.EGLIN
BY
ATTORNEY

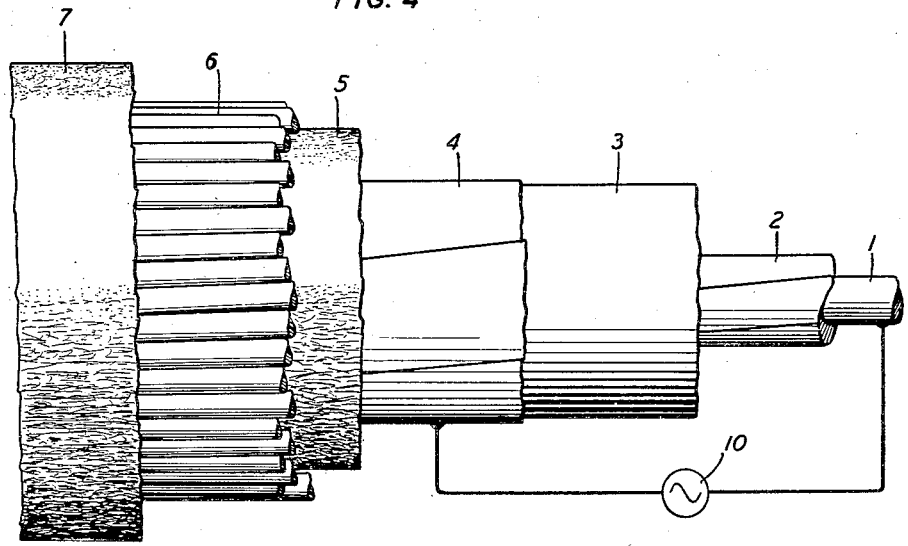
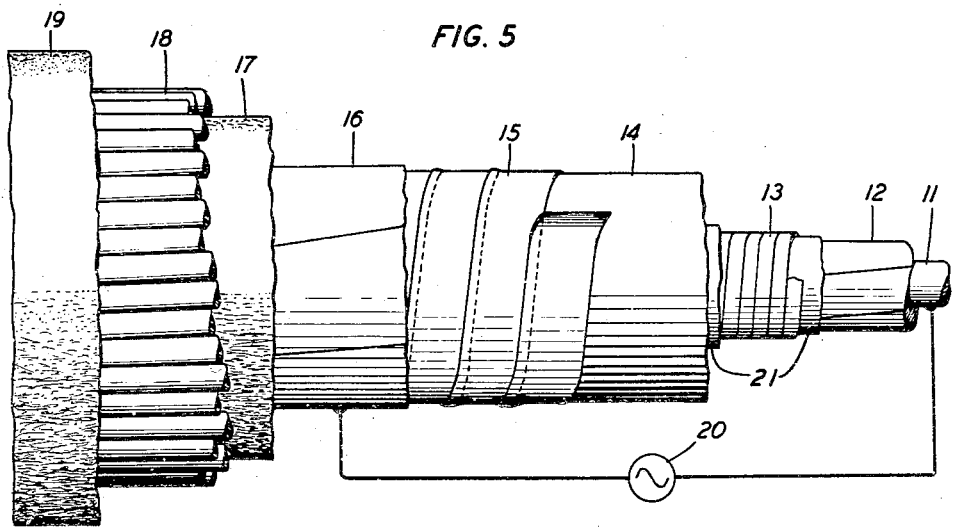

Patented Sept. 11, 1934

1,972,877

UNITED STATES PATENT OFFICE 1,972,877

CONCENTRIC RETURN TRANSMISSION SYSTEM

James M. Eglin, Glen Rock, N. J., assignor to Bell Telephone Laboratories, Incorporated, New York, N. Y., a corporation of New York Application January 14, 1932, Serial No. 586,478

10 Claims. (Cl. 178—44)

This invention relates to conducting systems for the transmission of alternating electrical waves, and more particularly to the design of such systems wherein one conductor serves as a concentric return for the other.

An object of the present invention is to increase the efficiency with which waves are transmitted over a concentric-return conducting system.

More particularly the object of the invention is to reduce the maximum attenuation of waves in a concentric-return submarine cable adapted for carrier-wave transmission, or, from another aspect, to decrease the cost of such a cable.

In accordance with the present invention, the foregoing objects are attained by observing a critical relation between the thickness of the material comprising the return conductor of the concentric system, the diameters of the conductors, and the frequencies of the waves transmitted.

The current in the return conductor of a concentric system, because of a phenomenon analogous to proximity effect, concentrates to a certain extent at the inner surface of the return conductor. At frequencies in the carrier-wave telephone range or higher the concentration is so marked that only a thin layer of conductor is effective, and the return conductor may be reduced to a correspondingly thin shell without substantially increasing its effective resistance. With continued decrease in the thickness of the conductor a point is eventually reached, of course, where the resistance begins to increase rapidly and to approach infinity. Shortly before this point is reached, applicant has discovered, the effective, or alternating-current, resistance of the conductor drops to a minimum value, i. e., to a value which is lower than that obtaining with any other thickness of conductor. The optimum thickness varies with both frequency and the diameters of the conductors. At a frequency of ten thousand cycles per second the optimum value for a return conductor of one centimeter diameter is roughly one millimeter; at one million cycles, approximately one-tenth of a millimeter. In a signaling system, the frequencies transmitted ordinarily occupy a wide band. Since the thickness of the return conductor cannot be precisely the optimum for more than one frequency, it is preferably proportioned with respect to some particular frequency, as for example, the one subject to the maximum attenuation, viz., the highest frequency transmitted.

The nature of the present invention will more fully appear from the following detailed discussion, reference being made to the accompanying drawings, in which:

Figs. 4 and 5 represent submarine cables embodying the present invention.

Figure 1:
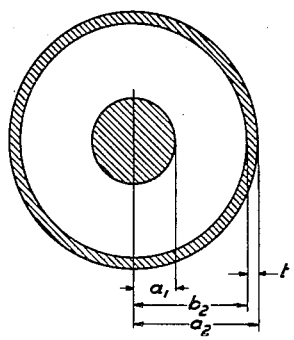
Fig. 1 represents diagrammatically a cross-section of a concentric return cable.

The optimum thickness of return conductor for any particular case can be arrived at through the use of precise mathematical expressions for the attenuation of a concentric-return system. An expression of sufficient exactness may be derived from the Equation (26) for the electric field intensity at the inner surface of a concentric-return conductor given by J. R. Carson and J. J. Gilbert at page 98 of the Bell System Technical Journal for July, 1922:

(1) $\quad E'_2 = Z'_{21} I_1 + Z'_{22} I_2$ $I_1$ and $I_2$ are the currents in the central conductor and the concentric return, respectively; and $Z'_{21}$ and $Z'_{22}$ may be calculated from the dimensions and the electrical constants of the return by using Formula (8) at page 92 of the publication just referred to.

In the instant case, where the return current is confined to the conductor, $I_2 = -I_1$, and (2) $\quad E'_2 = (Z'_{21} - Z'_{22}) I_1$ The internal impedance $Z_2$ of the return, by reference to page 97, Formula (25) of the Carson and Gilbert article, is seen to be in this case (3) $\quad Z_2 = Z'_{22} - Z'_{21}$ Applying Formula (8), page 92, this expression becomes (4) $\quad Z_2 = \dfrac{2\mu_2 i p J_0(y_2) K'_0(x_2) - J'_0(x_2) K_0(y_2)}{y_2 J'_0(x_2) K'_0(y_2) - J'_0(y_2) K'_0(x_2)}$ where $a_2$ = external radius of return conductor in cm.

$b_2$ = internal radius of return conductor in cm.

$x_2 = i a_2 \sqrt{4\pi \lambda_2 \mu_2 p i}$ $y_2 = i b_2 \sqrt{4\pi \lambda_2 \mu_2 p i}$ $\mu_2$ = permeability of the material comprising the return conductor $\lambda_2$ = conductivity of the material comprising the return conductor $p = 2\pi \times$ frequency $i = \sqrt{-1}$ $J_0$, $J'_0$, $K_0$ and $K'_0$ are Bessel's functions as employed by Carson and Gilbert. For values of the argument in the range where tables are available, $J_0(ki\sqrt{i}) = \text{ber } k + i \text{ bei } k$ and $K_0(ki\sqrt{i}) = \text{ker } k + i \text{ kei } k,$ $k$ being any real number. Outside the tabulated range of values, formulæ may be used, such, for example, as given by H. B. Dwight in an article entitled "Bessel's Functions for A. C. Problems" appearing in vol. 48 of the Transactions of the American Institute of Electrical Engineers, July 1929, page 48.

With the proper values substituted in Equation (4), the real component of the complex resultant gives the effective or alternating-current, resistance $R_r$ of the return conductor and the imaginary component, $2\pi i$ times the product of frequency and internal inductance $\Delta L_r$ of the return. By internal inductance is meant the portion of the total inductance resulting from magnetic flux within the conductor. Both resistance and internal inductance depend on the nature of the conducting material, its temperature, the frequency, and the diameter and thickness of the return conductor.

It is found by calculating the effective resistance and plotting it against the thickness of the return conductor that the effective resistance does not, as might be expected continuously increase as the thickness is reduced. Instead, as the thickness is increased from infinitesimal values, the resistance first rapidly decreases, passes through a minimum value, gradually rises to a maximum point, and then continues to oscillate about a constant, asymptotic value that is quickly approached with further increase in thickness. These variations are represented by the curve $R_r$ in Fig. 2, where the effective resistance of the return conductor in ohms per nautical mile is plotted against thickness of the return in mils. The first minimum point is an absolute minimum; i. e., the resistance is less at this particular thickness than at any other thickness of conductor. The difference between this minimum resistance and the asymptotic value is appreciable; in particular cases it may amount to eight per cent. Practically, the oscillations of resistance about the asymptote are so highly damped that only the first minimum and first maximum are significant in the design of transmission systems.

A physical explanation of this unexpected variation of resistance with thickness involves the fact that there is a difference in phase between the waves at the surface of the return conductor and the waves within the conductor. There may be, in fact, several complete reversals of phase between the inner surface of the return conductor and the outer surface, alternate layers of conductors, in effect, carrying oppositely directed waves. Where the thickness is such that there is a 90° phase shift between inner and outer surfaces, the resultant current is a maximum, since the current in no part of the conductors has an oppositely directed component; increasing the thickness of the conductor until there is a 180° phase shift between surfaces reduces the total current, since oppositely directed components are introduced. With a 270° phase shift the current is again increased, and the resistance thus continues to oscillate about an asymptotic value that is quickly approached as the thickness of the conductor is increased. For all values of thickness greater than that producing the first maximum point the effective resistance of the return conductor is practically constant; conductors of such thickness may be termed "electrically thick".

The internal inductance of the return conductor goes through a corresponding variation as the thickness of the conductor is increased. In this case, the curve rises from zero passes through a maximum point, and then assumes a practically constant value. The maximum inductance is obtained at a somewhat greater thickness than that yielding minimum resistance.

In the design of submarine cables or other transmission systems, minimum signal attenuation is a desideratum. Both low resistance and high inductance are therefore objectives. As stated, the thickness of return conductor that yields minimum resistance is not the same as that yielding maximum internal inductance. Considering the fact, however, that the internal inductance of the return is usually a small part of the total inductance of the cable and that the maximum point on the internal inductance curve is only slightly above the constant value obtaining with thick return conductors, little would be gained in designing the cable for maximum inductance instead of for minimum resistance. In fact, the variation of inductance with thickness is so insignificant in the range of frequencies and thickness under consideration that for practical purposes it may be disregarded. For minimum attenuation, then, a thickness of return conductor yielding minimum resistance would be used rather than one yielding maximum inductance.

Figure 2:
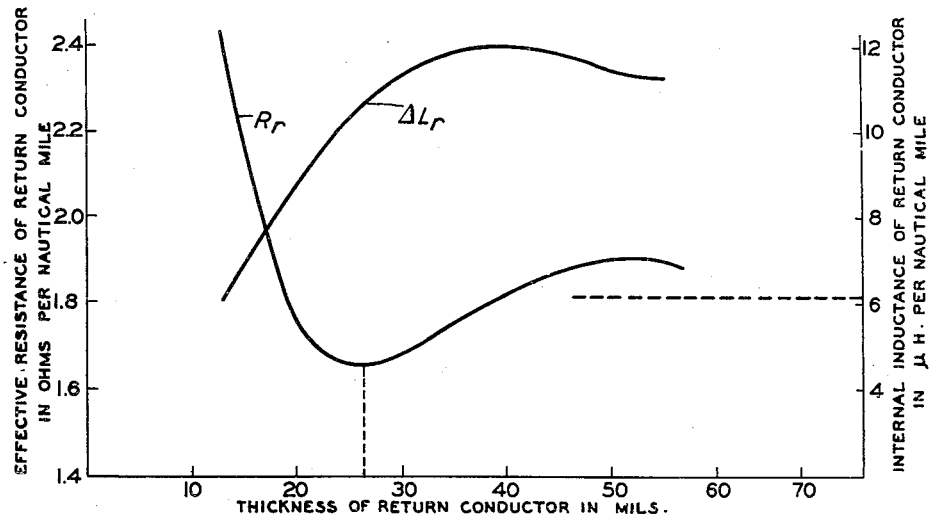
Fig. 2 shows graphically how the resistance and internal inductance of the return conductor vary with the thickness of the conductor.

Since the attenuation is largely controlled by the resistance factor, the variations of attenuation with thickness of return follow closely the corresponding variations of resistance illustrated in Fig. 2.

Where a wide band of frequencies is transmitted, as is usual in a signaling system, the thickness of the return conductor, as stated hereinbefore, cannot be made the optimum for each frequency involved. Preferably, the maximum signaling frequency is ordinarily used as the basis for the design inasmuch as it is the highest frequencies that the transmission line inherently attenuates the most. In some cases, however, it may be preferable to design the return conductor with respect to some frequency within the signaling band. If, for example, the interference level is not the same throughout the signaling band but has a peak at some particular frequency, the resistance of the return conductor may be made the minimum for that frequency so that the signal level at that frequency will not approach too closely the noise level.

Figure 3:
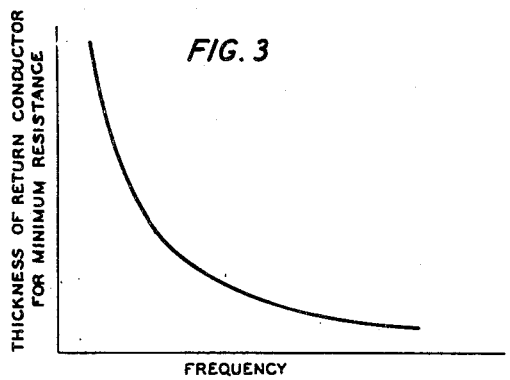
Fig. 3 shows graphically how the optimum thickness varies with frequency.

Fig. 3 shows qualitatively how the thickness that is the optimum as regards resistance, and therefore as regards attenuation, varies with frequency, a fixed diameter of return conductor being assumed.

A thickness less than that providing minimum attenuation may be found preferable in the practical design of submarine cables. The curve $R_r$ of Fig. shows that reducing the thickness from the optimum value does not greatly change the resistance. The copper, or other material comprising the conductors, saved by reducing the thickness of the outer conductor from the theoretical optimum can in some cases be advantageously applied to the central conductor. Increasing the diameter of the central conductor, while it reduces the effective resistance of that conductor, increases the capacitance, and hence tends to increase the attenuation of the cable. The change involved in the amount and cost of the insulating material is also to be considered. In general if an economic balance of these several factors be struck, a thickness somewhat less than the optimum hereinbefore defined will be obtained. The increase in attenuation due to the slight change in resistance of the return conductor is ordinarily more than offset by the decrease in attenuation of the central conductor resulting from its increase in diameter.

In Fig. 4 is represented a concentric return submarine cable in accordance with the present invention in which the thickness of the return conductor is critically related to the frequencies of the signals applied to it by source 10. The latter source may be, for example, the terminal circuit of a carrier-wave transmission system, the highest frequencies of which may be of the order of 40,000 cycles per second. One side of the electrical circuit comprises the central copper core 1 and the surrounding spiraled copper tapes 2. These "surrounds" are preferably shaped to present a smooth cylindrical surface so that the distribution of current is uniform. In a particular case where a central core of 0.133 inch diameter was used, six surrounds were used, each 0.079 inch wide and 0.014 inch thick and with a right-hand lay of 2.75 inches. A thin covering of melted rubber may be used to impregnate the compound central conductor, and the whole enclosed with suitable insulating material 3, such as paragutta. The other side of the electrical circuit comprises the thin copper tapes 4, which are applied in a slow spiral over the insulation 3 to form an approximately tubular return conductor. Protective coverings 5 and 7 of jute and a sheath 6 of copper-clad steel are applied to the exterior.

At a frequency of 40,000 cycles per second, and for a return conductor of five-eighths inch diameter, an optimum thickness of approximately 0.020 inch is indicated by the plot of Equation (4). The copper tapes 4 are therefore made of this thickness or slightly less. It is apparent, of course, that the present invention is applicable also where the tubular return conductor comprises other than a plurality of tapes. The application of the principles herein set forth is in general not limited by the particular structure of the return, since the phenomenon on which the invention is based depends primarily on the existence of a proximity effect.

It is common practice in the design of submarine cables to provide a wrapping of thin brass or copper tape as a protection against teredos and other marine life. Fig. 5 shows a loaded, concentric return submarine cable protected in this manner. To the central core 11 and surrounds 12 are applied a wrapping 13 of highly permeable magnetic material and insulation 14. The interposed pressure equalizing layers 21 may be, for example, of bitumen. Teredo tape 15 may be one inch wide and served with a ten percent overlap on the insulation 14 with the return conductor 16 immediately over it; alternatively, the relative positions of the teredo tape and return conductor may be reversed. As the teredo tape usually has a thickness of the order of 0.04 inch and a very short lay, its effective resistance is high as compared with that of the return conductor. To reduce losses, the return conductor is preferably placed in intimate contact with the protective layer, as described and claimed in an application of J. J. Gilbert bearing Serial No. 492,135, filed October 30, 1930, which issued on September 12, 1933 as U. S. Patent 1,926,899. Because of the action of the teredo tape as a conductor the design of the return conductor proper may require slight modification. Minimum attenuation will usually be found at a thickness somewhat smaller than the theoretical optimum. The exact optimum thickness in any particular case can be ascertained most accurately by experiment.

While applicant has described his invention as embodied in a submarine cable of specific design, it is obvious that it may find application in concentric return conducting systems of widely different types. The invention is therefore to be limited only by the scope of the appended claims.

What is claimed is:

1. A submarine cable comprising a central conductor and a tubular return conductor concentric therewith, and means to apply to said cable signal waves extending in frequency into the carrier telephone range, said return conductor having the thickness which gives minimum attenuation with variation in thickness at the maximum frequency transmitted.

2. A submarine cable comprising a central conductor and a concentric return conductor, and means to apply to said cable signaling waves extending in frequency to at least ten thousand cycles per second, said return conductor being so proportioned that its effective resistance at the maximum signaling frequency transmitted is less than that obtaining with an electrically thick conductor of the same internal diameter.

3. A submarine cable comprising a central conductor and a concentric return conductor, and means to apply to said cable signaling waves extending in frequency to at least ten thousand cycles per second, the thickness of said return conductor being less than that obtaining for minimum effective resistance to the maximum signaling frequency transmitted, and the effective resistance of said return conductor being less than that obtaining with an electrically-thick conductor of the same internal diameter.

4. A submarine cable comprising a central conductor, a return conductor concentric therewith, a solid dielectric separating said conductors, and protective layers external to said return conductor, and means to apply to said cable carrier-wave telephone signals, said return conductor being of such thickness that the attenuation of said cable at a signaling frequency near the top of the signaling band transmitted is less than that obtaining with an electrically-thick conductor of the same internal diameter.

5. A submarine cable comprising a central conductor, a return conductor concentric therewith, a solid dielectric separating said conductors, and protective layers external to said return conductor, and means to apply to said cable carrier-wave telephone signals, the thickness of said return conductor being not greater than that providing minimum attenuation of signaling waves of maximum frequency, and the effective resistance of said return conductor being less than that obtaining with an electrically-thick conductor of the same internal diameter.

6. A transmission system comprising a pair of concentric conductors and means to apply thereto signaling waves extending in frequency into the carrier telephone range, the thickness of the outer of said conductors being greater than that providing minimum effective resistance for signaling waves of maximum frequency, but such that the effective resistance of said system at said maximum frequency is less than that obtaining with electrically thick conductors.

7. A transmission system comprising a pair of concentric conductors and means to apply thereto signaling waves extending in frequency to at least ten thousand cycles per second, the thickness of the outer of said conductors being in the range of thickness where the effective resistance of said conductor at the highest frequency transmitted is less than the resistance of an electrically thick conductor, said thickness also being greater than that yielding minimum resistance at said highest frequency.

8. A submarine cable comprising a central conductor, a return conductor concentric therewith comprising a plurality of spiralled tapes, solid insulating material between said conductors, a serving of teredo-proof metallic tape in contact with and thinner than said return conductor, and a protective covering; and means to apply to said cable carrier-wave signals at least ten thousand cycles per second in frequency; said return conductor being so proportioned with respect to the highest signaling frequency transmitted that the effective resistance of said cable at said highest frequency is less than that obtaining with an electrically thick conductor of the same internal diameter.

9. A submarine cable comprising a central conductor and a tubular return conductor concentric therewith, and means to apply to said cable signal waves extending in frequency into the carrier telephone range, the thickness of said return conductor being the optimum as regards attenuation for a frequency at least as high as the maximum signaling frequency transmitted.

10. A submarine cable comprising a central conductor and a tubular return conductor concentric therewith, and means to apply to said cable signal waves extending in frequency into the carrier telephone range, the thickness of said return conductor being the optimum as regards attenuation for the frequency at which the signal level most nearly approaches the level of interference.

JAMES M. EGLIN.